R. P. H. KOSKA.
Egg-Tongs.

No. 220,390. Patented Oct. 7, 1879.

WITNESSES:
Henry N. Miller
C. Sedgwick

INVENTOR:
R. P. H. Koska
BY Munn &Co
ATTORNEYS.

UNITED STATES PATENT OFFICE.

REINHOLD P. H. KOSKA, OF EAST SAGINAW, MICHIGAN.

IMPROVEMENT IN EGG-TONGS.

Specification forming part of Letters Patent No. 220,390, dated October 7, 1879; application filed July 17, 1879.

*To all whom it may concern:*

Be it known that I, REINHOLD P. H. KOSKA, of East Saginaw, in the county of Saginaw and State of Michigan, have invented a new and Improved Egg-Tongs, of which the following is a specification.

Figure 1:
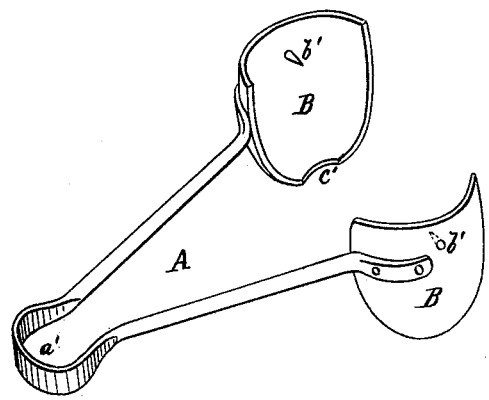
Figure 2:
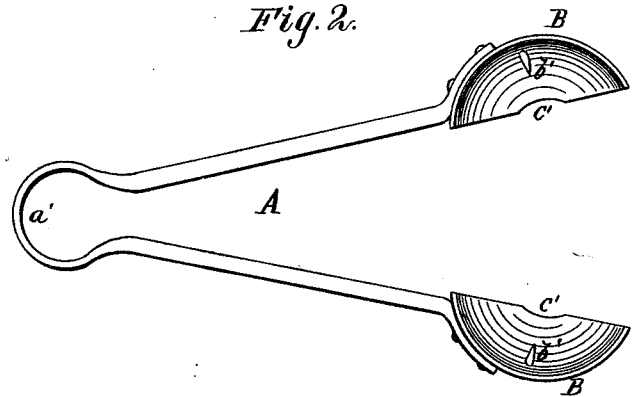

Figure 1 is a perspective view of the tongs. Fig. 2 is a plan of the same.

Similar letters of reference indicate corresponding parts.

The object of this invention is to provide a device for holding eggs, so that the unpleasant contact of the fingers with hot boiled eggs while opening them and extracting their contents may be avoided.

The invention consists of a pair of tongs, whose legs terminate in like concavo-convex plates that when closed together shall be in shape like an egg with its upper third removed, so that when they are brought together they may embrace and cover the lower two-thirds of the egg; and it further consists in furnishing the interior surface of each plate with a sharp stud or pin to penetrate the shell of the egg and keep it from slipping or turning in the tongs.

In the drawings, A represents the handle of the tongs, which is simply a bent metallic rod flattened midway of its length, at $a'$, to give it the required elasticity.

The ends of the handle are slightly drawn out and curved outward, and to their inner faces are riveted or otherwise secured the concavo-convex plates B, which taper downward from their upper rims, and when set together form a mold or receptacle of the shape of the half of an egg.

Each plate is provided with a sharp inwardly-projecting stud, $b'$, to prevent the egg from turning or slipping in the tongs, and each one is cut away slightly at the bottom, as shown at $c'$, to permit the free drainage of water from the egg as it is taken up or held by the tongs.

Instead of the studs $b'$, the rim of the device may be furnished with projecting points to serve the same purpose, and the concavo-convex plates may be made of wire-work instead of plain metallic plates, as herein shown.

Having thus described my invention, I claim as new and desire to secure by Letters Patent—

Table-tongs to hold parboiled eggs while being opened, consisting of the handle A, made elastic at the bent part $a'$, and having egg-holders B $c'$ at right angles thereto, as shown and described.

REINHOLD P. H. KOSKA.

Witnesses:
CHARLES REINKE,
GEORGE THRASHER.